(12) United States Patent
Kumar et al.

(10) Patent No.: US 8,065,618 B2
(45) Date of Patent: Nov. 22, 2011

(54) CUSTOMIZATION OF AN INTERACTION CENTER MANAGER'S GRAPHICAL DASHBOARD

(75) Inventors: Janaki Kumar, Palo Alto, CA (US); Venupriya Nadella, Sunnyvale, CA (US); Thorsten Pricken, San Mateo, CA (US); Jodette Kruger, Daly City, CA (US); Brett Hamner, Santa Cruz, CA (US)

(73) Assignee: SAP AG, Walldorf (DE)

(*) Notice: Subject to any disclaimer, the term of this patent is extended or adjusted under 35 U.S.C. 154(b) by 825 days.

(21) Appl. No.: 10/804,320

(22) Filed: Mar. 18, 2004

(65) Prior Publication Data
US 2005/0043987 A1  Feb. 24, 2005

Related U.S. Application Data

(60) Provisional application No. 60/496,164, filed on Aug. 18, 2003.

(51) Int. Cl.
*G06F 15/177* (2006.01)
(52) U.S. Cl. ......... 715/736; 715/792; 715/771; 715/704
(58) Field of Classification Search .................. 345/792; 715/736, 792, 771, 704
See application file for complete search history.

(56) References Cited

U.S. PATENT DOCUMENTS

| | | | |
|---|---|---|---|
| 5,499,291 A * | 3/1996 | Kepley | 379/265.06 |
| 5,819,263 A * | 10/1998 | Bromley et al. | 707/3 |
| 5,926,539 A | 7/1999 | Shtivelman | |
| 6,381,640 B1 | 4/2002 | Beck et al. | |
| 6,445,682 B1 * | 9/2002 | Weitz | 370/257 |
| 6,466,663 B1 * | 10/2002 | Ravenscroft et al. | 379/265.01 |
| 6,526,397 B2 * | 2/2003 | Chee et al. | 707/1 |
| 6,539,419 B2 | 3/2003 | Beck et al. | |
| 6,542,156 B1 * | 4/2003 | Hong et al. | 345/440 |
| 6,563,920 B1 * | 5/2003 | Flockhart et al. | 379/265.1 |
| 6,584,191 B1 | 6/2003 | McPartlan et al. | |
| 6,587,556 B1 | 7/2003 | Judkins et al. | |
| 6,704,409 B1 | 3/2004 | Dilip et al. | |
| 7,046,789 B1 * | 5/2006 | Anderson et al. | 379/265.01 |
| 7,120,647 B2 * | 10/2006 | Venkatesh et al. | 706/60 |
| 2002/0095462 A1 | 7/2002 | Beck et al. | |
| 2002/0145628 A1 * | 10/2002 | Burgin et al. | 345/760 |
| 2002/0149601 A1 * | 10/2002 | Rajarajan et al. | 345/619 |
| 2002/0175929 A1 * | 11/2002 | Hunt et al. | 345/704 |
| 2002/0175943 A1 * | 11/2002 | Hunt et al. | 345/771 |
| 2003/0137536 A1 * | 7/2003 | Hugh | 345/744 |
| 2003/0227487 A1 * | 12/2003 | Hugh | 345/777 |

(Continued)

OTHER PUBLICATIONS

"Aspect Administration and Development Tools," *Aspect*, 2002, obtained at http://www.aspect.com/mm/pdf/products/pstn/Aspect_Admin_Dev_Tools ds.pdf, 4 pages.

(Continued)

*Primary Examiner* — Simon Ke
(74) *Attorney, Agent, or Firm* — Fish & Richardson P.C.

(57) ABSTRACT

Systems and techniques are described for a computer program product that can provide an interaction center (IC) manager's graphical user interface on an interconnected display device. The graphical user interface includes an overview area displaying at least one user-selected statistic that relates to a user-selected group of interaction center agents being monitored and a detailed area displaying a list of each of the user-selected group of interaction center agents being monitored and further displaying for each of the listed agents at least one user-selected monitored statistic relating to the listed agents.

16 Claims, 16 Drawing Sheets

U.S. PATENT DOCUMENTS

2004/0184593 A1* 9/2004 Elsey et al. .............. 379/218.01
2004/0268265 A1* 12/2004 Berger ........................ 715/752

OTHER PUBLICATIONS

"About Genesys Call Center Pulse" *Genesys*, 1998, obtained at http://www.euronetrt.hu/termekek/genesys/ccpulse.pdf, 4 pages.

"FAQ: Descriptionof Genesys G*plus* Adapter for mySAP™ Customer Relationship Mangagement (CRM)" *Genesys and SAP Solutions*, 2002, obtained at http://www.sap.com/australia/fasttrack/faq.pdf, 5 pages.

"The E-Business Workplace: Discovering the Powe rof Enterprise Portals," *John Wiley & Sons*, Inc., document undated, copyright © 2001, 6 pages.

* cited by examiner

360

Interaction Center Status

364 — No Spanish Coverage ▸ 2 | Overview

📠 8  📧 3  ☎ 4  👥 2  ✓ 2

Vol : Medium
AHT : 8:45
ASA : 0:22

| PS | GS | OA | SC | SR | TR |
|---|---|---|---|---|---|
| 2/1 | 10/5 | 2/4 | 3/5 | 7/5 | 2/4 |

Show: Tina's Team ▼ — 362 | Message | Call | Listen |

| Agent | Skills | Schedule | State | Time |
|---|---|---|---|---|
| Rose Brandon | F,1 | ☐ | ☎ 9 | 4:12 |
| Marilyn Brinkley | 1 | ☐ | 📧 | 0:27 |
| Patty Cortez | 0,1 | ☐ | ☎ | 7:12 |
| 214 calls; AHT 9:41; ASA 0:17 | | | | |
| Brian Foreman | 1,2,A | ☐ | 👥 | 1:14 |
| Fay Gonzales | 0,1,2 | ☐ | 📧 | |
| Ernie Gurdon | 0,1 | ☐ | 📠 | 13:55 |
| Catherine Jones | 2,A | ☐ | 👥 | 14:21 |
| Danielle King solver | 1,2 | ☐ | ✓ | 0:03 |
| Janet Lakes | 2,A | ☐ | ☎ | 45:22 |
| Brian Foreman | 1,2 | ☐ | 📠 | 1:14 |
| Fay Gonzales | 2,A | ☐ | 📧 | |
| Ernie Gurdon | 1,2 | ☐ | ✓ | 13:55 |
| Catherine Jones | 2,A | ☐ | & | 14:21 |
| Danielle King solver | 1,A | ☐ | 📧 | 0:03 |
| Janet Lakes | A,2 | ☐ | ☎ | 45:22 |
| Brian Foreman | 0,1 | ☐ | ☎ | 1:14 |
| Fay Gonzales | 1,A | ☐ | 📭 | |
| Ernie Gurdon | 2,A | ☐ | 👥 | 13:55 |
| Catherine Jones | 0,A | ☐ | ☎ | 14:21 |
| Danielle King solver | 1 | ☐ | ☎ | 0:03 |
| Janet Lakes | 2,A,1 | ☐ | 📠 | 45:22 |
| Brian Foreman | 0,A | ☐ | 👥 | 1:14 |
| Fay Gonzales | 2 | ☐ | ✗ | |

FIG. 8

Dashboard Personalization

Set Queue Limits

Set thresholds and enter abbreviation for each queue.

| Queues | Abbreviation | Key Figures | Limit |
|---|---|---|---|
| Platinum Sales | PS | Cust. Waiting | > ▸ 2 |
| | | Cust. Online | < ▸ 1 |
| Gold Sales | GS | Cust. Waiting | > ▸ 10 |
| | | Cust. Online | < ▸ 2 |
| New Order Activation | OA | Cust. Online | > ▸ 17 |
| | | Cust. Waiting | < ▸ 17 |
| Sales Confirmation | SC | Cust. Online | > ▸ 2 |
| | | Cust. Waiting | < ▸ 2 |
| Service Confirmation | SR | Cust. Online | > ▸ 17 |
| | | Cust. Waiting | < ▸ 17 |
| Technical Service | TS | Cust. Online | > ▸ 17 |
| | | Cust. Waiting | > ▸ 17 |
| Premium Customer | PC | Cust. Online | > ▸ 17 |
| | | Cust. Waiting | > ▸ 17 |
| Service Technician | ST | Cust. Online | |

Sidebar:
- Start
- Profiles
- Agent Groups
- Channels and Queues
- Selection
- Key Figures
- Queue Limits
- Alerts, Overview & Agent
- Key Figures
- Alert Limits
- Other Limits
- Default Profile
- Finish Back | Continue | Cancel

FIG. 11A

Dashboard Personalization

Set Alert Limits

Define a priority, set a threshold and enter a message for each alert. For icon alerts, choose an appropriate icon.

Dialog Alerts (High priority) — 372

| Statistics | Limit | | Message |
|---|---|---|---|
| CallsPerHour | > | 17 | Calls/hr very high |
| CallsPerDay | < | 90 | Calls/day drop very low |
| TotalsByChannel | > | 2 | Totals/ch very low |

Text Alerts (Medium priority) — 386

| Statistics | Limit | | Message |
|---|---|---|---|
| CallsPerHour | > | 10 | Calls/hr increase |
| CallsPerDay | < | 150 | Calls/day below normal |
| TotalsByChannel | > | 5 | Totals/ch increase |

Icon Alerts (Low priority) — 388 394

| Statistics | Limit | | Icon and Message |
|---|---|---|---|
| CallsPerHour | < | 3 | 1 ☎ Calls/hr very low |
| CallsPerDay | < | 175 | 2 ✉ Calls/day below average |
| TotalsByChannel | < | 8 | 3 ✕ Totals/ch normal |

Sidebar: Start, Profiles, Agent Groups, Agent Skills, Channels and Queues, Selection, Key Figures, Queue Limits, Alerts, Overview & Agent, Key Figures, Alert Limits, Other Limits, Default Profile, Finish

FIG. 14

CUSTOMIZATION OF AN INTERACTION CENTER MANAGER'S GRAPHICAL DASHBOARD

CROSS REFERENCE TO RELATED APPLICATIONS

This application claims the benefit of priority from U.S. Provisional Application entitled "Customization of a Supervisor's Graphical Dashboard," filed Aug. 18, 2003, Application Ser. No. 60/496,164.

TECHNICAL FIELD

This invention relates to the use of a graphical dashboard in a computing system.

BACKGROUND

In today's business society, customer relations and customer satisfaction are critical for successful and profitable operations. Customers purchase various products and services from a variety of providers, and use various purchase means. When customers purchase various products and services, they often have questions, concerns, or complaints about their purchases. To maximize customer satisfaction, businesses must be capable of responding quickly and effectively to customer questions, concerns, or complaints. Many businesses employ customer care agents in interaction centers (IC) who are responsible for interacting with customers. These agents may interact with customers personally or over the telephone. More recently, many customer care agents engage in interactive chat sessions with customers over the Internet or by e-mail and other channels. These chat sessions allow agents to communicate quickly and easily with customers all over the world.

In recent years, interaction centers have become much more widespread. A call center is one type of IC that has agents to receive calls from customers. The interaction center agents may deal with, for example, customer service calls or sales calls. The interaction centers manage many efforts, and interaction center agents working in these centers often place and receive thousands of calls to and from various customers in different regions of the country. These agents often use headsets to speak with customers while they enter information relating to the customers into a computer workstation.

Managers may be hired to improve the efficiency of the interaction center. A manager may need to monitor the activities within the center and, in particular, the activities of interaction center agents working in the center.

Managers may check the real-time status of the interaction center to assure that interaction center agents are adhering to their schedules and that calls are being handled expeditiously. A manager may rely on, for example, a scheduling of calls to maximize the use of the fewest interaction center agents to handle the volume of incoming calls. The manager may monitor the interaction center to ensure there is adequate coverage at all times.

Displaying an interaction center agent schedule can help the manager to monitor an agent and helping to organize the agent's time. In one example, a manager may not have a particular agent start an evaluation session that takes an estimated 45 minutes if the agent is scheduled complete his or her shift in less time. Because interaction centers may receive calls from customers that are geographically widespread, interaction center agents, in some cases, have to interact with customers who speak a variety of different languages. For example, in a product support interaction center, interaction center agents may need to field support questions from customers who are located in the United States, Canada and Mexico. In this example, a manager may route an evaluation session to a particular agent having appropriate language skills.

SUMMARY

The present application describes systems and techniques relating to displaying and managing overview and detailed statistics associated with activities in an interaction center.

In one aspect, the technique is facilitated by a computer program product including executable program instructions that when executed by a processor provide an interaction center (IC) manager's graphical user interface on an interconnected display device. The manager's graphical user interface includes an overview area displaying at least one user-selected statistic that relates to a user-selected group of interaction center agents being monitored and a detailed area displaying a list of each of the user-selected group of interaction center agents being monitored and further displaying for each of the listed agents at least one user-selected monitored statistic relating to the listed agents.

The technique may include user-created profiles that associate the user-selected statistics for display on the graphical user interface. The technique also may include selecting a key figure associated with the statistic and selecting a threshold value for the key figure. An alert may be provided when a key figure exceeds the specified threshold value.

In another aspect, the technique includes receiving a selection of interaction center agents to be monitored using the manager's graphical user interface. Receiving a selection of an overview statistic that characterizes an activity of an interaction center so that the overview statistic as applied to the selected agents is displayed in an overview area of the graphical user interface displaying at least one user-selected statistic that relates to a user-selected group of interaction center agents being monitored. Receiving a selection of a detailed statistic that characterizes an activity of an interaction center agent so that the selected detailed statistic associated with each of the selected agents is displayed in a detailed area of the graphical user interface.

Other aspects include an article comprising a machine-readable medium storing machine-readable instructions that, when executed, cause a machine to perform the disclosed techniques, and/or a system that includes one or more computers configured to implement the disclosed techniques.

Some implementations of the systems and techniques described herein may provide one or more of the following advantages. The techniques can enable a manager to customize the information based on queues, channels, agent groups or interaction center statistics. For example, the manager may customize the information based on any form of statistics that are specified by a back-end or software module. This module may specify any set of statistics that may be pertinent to that given module. The manager's customization preferences can be stored as profiles and the manager may switch profiles based on interaction center needs. The system may provide an alert to notify a manager of a key figure associated with the interaction center exceeds a specified value.

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

FIGS. 3A-15 are display screens associated with an implementation of a personalized interaction center (IC) manager's dashboard.

Like reference symbols in the various drawings indicate like elements.

DETAILED DESCRIPTION

Figure 1:
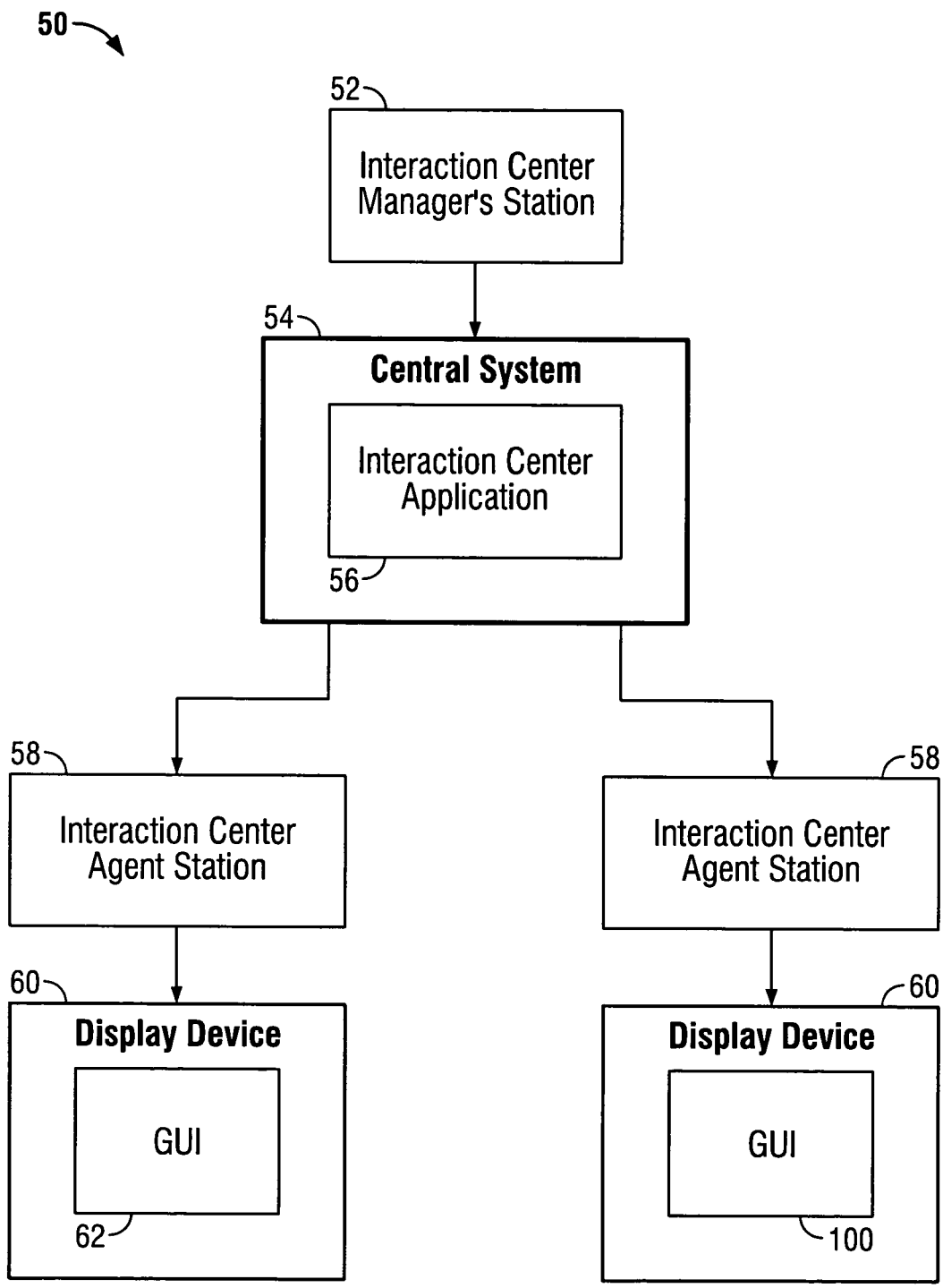
FIG. 1 is an exemplary block diagram of an interaction center.

The systems and techniques described here relate to implementation and execution of an interaction center (IC) Manager's display of the IC activities. The IC manager's display screen or other user interface that is displayed for the IC manager at his or her station. At least some part of the display screen may be used to display information related to the interaction center and may be referred to as a "dashboard." The dashboard may be in the form of a graphical user interface (GUI). The dashboard can provide the IC manager with a real-time view of the interaction (e.g., "call") center activities. An IC manager may personalize the information displayed on the dashboard.

An IC manager may be responsible for maintaining a satisfactory response rate to customer inquiries and maintenance of customer satisfaction. The manager may want to estimate the contact volume through the various channels that the center supports such as telephone, email and chat.

The contacts may be organized into categories such as product sales or service. The contacts in each contact category may be thought of as in a queue waiting for a response. Each of the queues may be staffed with agents responding to customer inquiries through the various channels. The manager may staff the various queues accordingly, monitor them constantly and adjust the staffing as desired. For example, if there are too few agents, then the response rate to a customer inquiry may drop leading to low customer satisfaction, and if there are too many agents, there may be unutilized resources adversely affecting the operating cost of the interaction center. To enhance the manager's effectiveness in monitoring the interaction center, at least a summary of the information that the manager desires may be provided in real-time and always available on the dashboard display of the manager's station.

By monitoring the interaction center activities, the IC manager may be able to utilize the resources and agents of the center to improve the services provided by the center. The system enables an IC manager to customize the dashboard for various interaction center profiles and may be based, for example on the expected call volume. Customization of the dashboard may be referred to as personalization. Each personalization represents a profile of the interaction center. The IC manager may have one or more dashboard profiles to use for various interaction center situations.

The techniques disclosed can enable a manager to customize the information based on queues, channels, agent groups or interaction center statistics. For example, the manager may customize the information based on any form of statistics that are specified by a back-end or software module. This module may specify any set of statistics that may be pertinent to that given module. The manager's customization preferences can be stored as profiles and the manager may switch profiles based on interaction center needs such as seasonality (e.g., Christmas, summer, Halloween), time of the day (morning, evening, afternoon) or promotional campaigns launch. The system also may provide an alert to notify the manager when a key figure associated with a statistic of the interaction center exceeds a specified value. The manager can then take appropriate action such as by assigning more agents to queues or sending messages to the agents. The managers also may send broadcast messages to their team or individual agents from the manager's dashboard. Such messages could appear on a designated area of the Agent's user interface may continue to appear until the agent acknowledges it as read. The techniques also enable the manager to monitor a customer contacts with an agent on the dashboard to enhance, for example, quality of the interaction center responses or help agents resolve tough customer situations smoothly.

The application is designed to be compact so it can coexist with other applications that the manager may want to work on. The manager can continue with their daily work, with the assurance that they will be notified proactively if an event triggering an alert happens.

FIG. 1 is an exemplary block diagram of an interaction center 50. The interaction center 50 includes a central system 54 having an interaction center software application 56, one or more interaction center agent stations 58 each having a display device 60 for displaying a graphical user interface (GUI) panel 62, and one or more IC manager stations 52. The customer interaction software application 56 includes functionality for generating information such as electronic messages to each of the GUI panels 62 of the display device 60. The interaction center system 50 also may include a network of telephony or equipment, network of computers, and/or routing system using a telephone system for routing incoming customer requests (e.g., telephone calls, on-line request, or other). These systems route the requests to center agent telephones and/or electronic communications (e.g., emails and chat sessions).

The interaction center 50 provides an infrastructure for handling a customer interaction session. Such a session may involve an interaction center being contacted by a customer and handling questions or problems regarding a product purchased by the customer. The interaction center stations 52 are assigned to one or more managers or IC managers who are responsible for handling workflow, calls and call agent concerns. Such task may include exchanging information between an IC manager and agents. For example, an IC manager sends messages to the agents from an IC manager station 52 for display on the display device 60 of all of the agent stations 58. As a result, a separate message board is no longer necessary because the interaction center agents can view and perform actions on the messages. This provides added flexibility to set up the interaction center 50, for example, agents no longer need not be positioned to see the board and may even be in completely different locations. Described below is an example of a screen that would be displayed on the IC manager's station 52.

Figure 2:
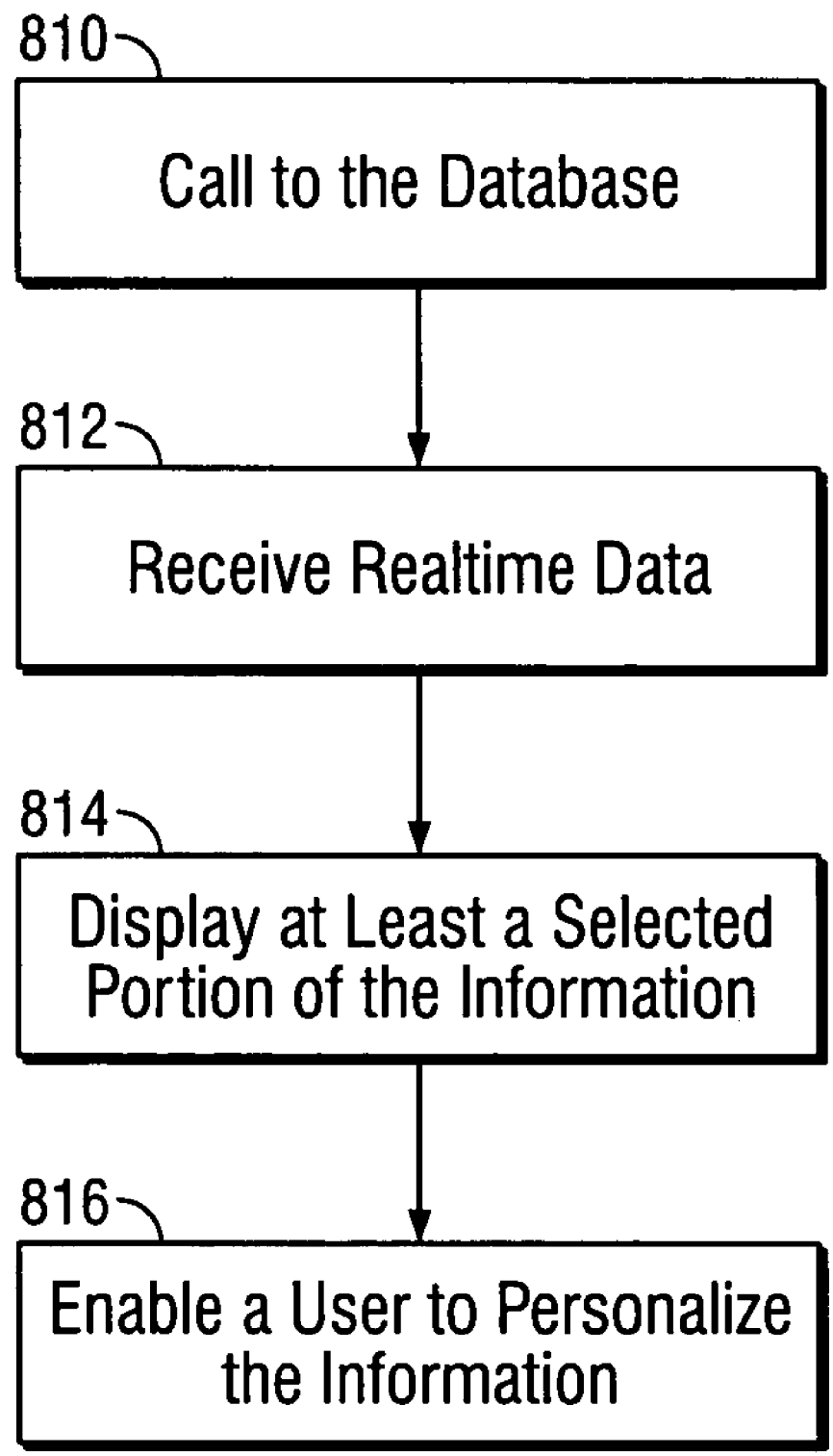
FIG. 2 is a flowchart of an implementation of an interaction center dashboard.

FIG. 2 is a flowchart of an implementation of a method for customizing an IC manager's dashboard display. The system may make a function call 810 to an interaction center database (not shown). The data required for an agent's schedule could be taken from a customer relationship management (CRM) system by a function module. A function call may be made to the function module from the dashboard and the received data 812 can be used to display the schedule 814. The function call could be made to the CRM system at an instantiation of the dashboard display. If any changes are made to the agent schedule, a notification could be sent to all IC managers. The dashboard may then be updated to view the revised schedule.

The call may request information associated with the interaction center including agent availability, agent skills and customer waiting times.

The interaction center database also may provide statistics associated with the interaction center including the average waiting time of a customer for an agent and average length of an interaction in a channel of communication. Some of these data are described in more detail below. The CRM system may keep real-time data associated with the interaction center and agents. The data may be constantly changing as the circumstances of the interaction center change. The display 814 can be updated to reflect the real-time data and may include all or some portion of the received 812 data.

Provision may be made to continuously display the received data can on the manager's dashboard. Thus, the portion of the data desired by the manager can remain on the dashboard for constant monitoring by the manager. The manager also may personalize 816 the information displayed on the dashboard. By selecting statistical and/or key figures, as discussed below, the manager may be able to provide for continuous monitoring of the interaction center and control the amount of the dashboard used by the display. Provision may be made for expanding the display to also display detailed information such as data associated with some or all of the interaction center agents. In an implementation, the dashboard display may provide an alert to signal the manager that a key figure exceeds a specified threshold. The manager also may have more than one profile of information displayed on the dashboard. The manager may select different assortments of data for display in each profile depending on the need. For example, different assortments of data may need monitoring based upon time of day or holidays.

Figure 3:
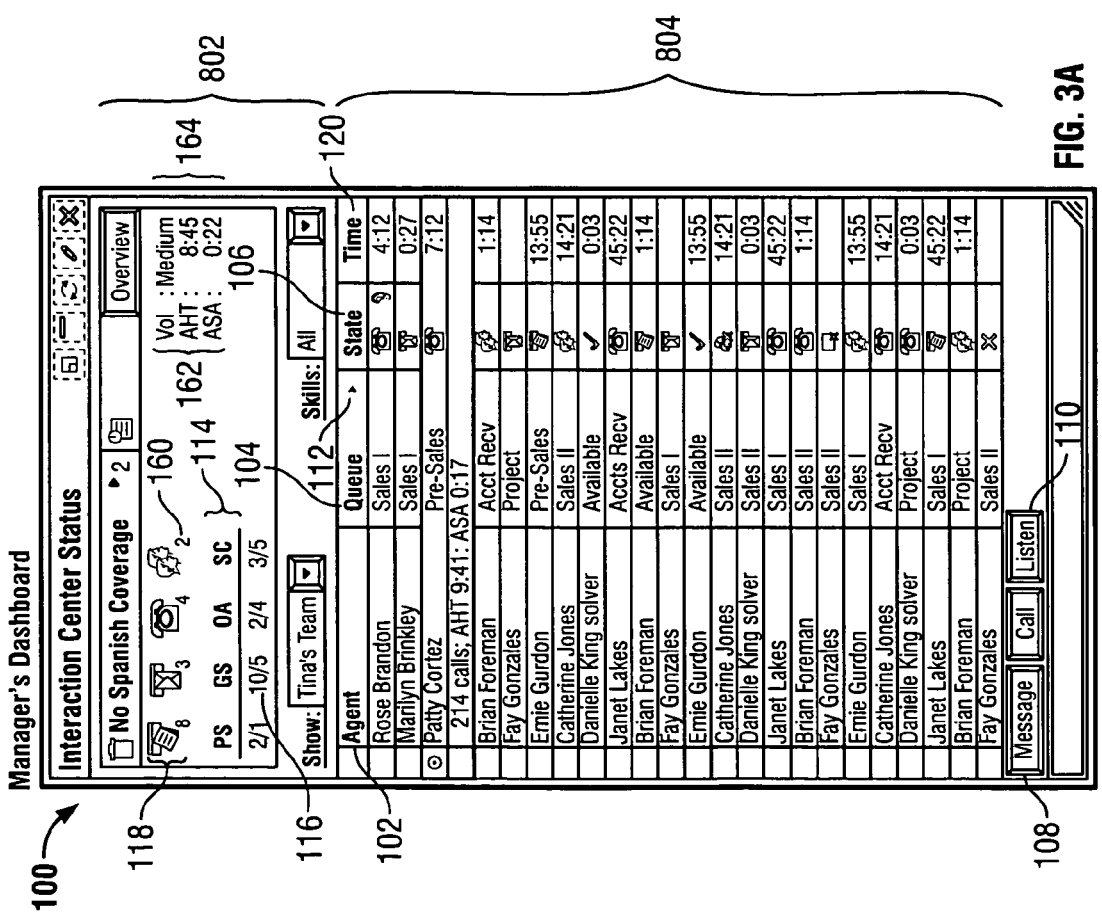

FIG. 3A illustrates an implementation of at least a portion of an IC manager's dashboard 100 for an interaction center. The dashboard 100 generally can have an upper portion 802 and a lower portion 804. The upper portion 802 may have summary information related to the overall operation of the interaction center. The upper portion 802 may include overview statistics related to the operation of the interaction center such as the "average handling time" (AHT) of a call and the "average speed to answer" (ASA) a call. The lower display 804 may display details of activities associated with individual interaction center agents. The lower display may include details such as the names 102 of the interaction center agents and the queue 104 to which the agent belongs. The IC manager may choose to display only the upper portion 802 or both. By only displaying the upper portion, the display occupies less space on the manager's display. The IC manager can then display the lower portion when desired, such as when alerted that an interaction center key figure exceeds a threshold value.

The IC manager may customize the upper portion display 802 to suit the personal needs of the IC manager. For example, the IC manager may want to display a statistic related to the length of time the agents are taking on calls. In this case, the IC manager may have the summary information may include the interaction center statistic average handling time (AHT) 162 and its value 164. A summary of the agents in a particular queue may be selected by the IC manager for display as an indication of the availability of agents in specific areas of expertise. The queue summary 114 may be displayed and associated with key figures 116, for example. The queue key figures, discussed in more detail below, are values for certain parameters associated with a queue.

The lower portion 804 may be divided into columns of information associated with each interaction center agent. In the example illustrated, four columns are displayed. The columns include the agent's name 102, the queue 104 that the agent is servicing, the state 106 (e.g., on a call or idle) that the agent is in and the time 120 that the agent has been the state. The agents may be sectioned into queues because of particular skills of the agent. For example, certain agents may be assigned to respond to interaction center inquiries concerning accounts receivables ("Accts Recv") because of the agent's familiarity or training in the area. An icon may represent the state 106 of the agent. FIG. 3B is an example of some possible icons that may be used to represent the state of an agent in the interaction center. The icons can provide the IC manager with a visual indication of the status of the agents, their availability, involvement as well as other states. The icons can include symbols for channels of communication such as paging, email and phone that an agent may have in use and on which the IC manager desires to monitor the activity. Other icons may represent the status of the communication or other interaction center agent status. The channels available 118 and associated channel key figure also may be displayed on the dashboard. A channel key figure 160, discussed in more detail below, is a value for a particular parameter associated with a channel. Overview key figures 162 and their values 164 may also be personalized for display on the IC manager's dashboard. The key figures may be abbreviated as described below. A message button 108 may be provided for the IC manager to contact the agents. A listen button 110 may be provided for the IC manager to monitor the agent's calls.

Figure 4:
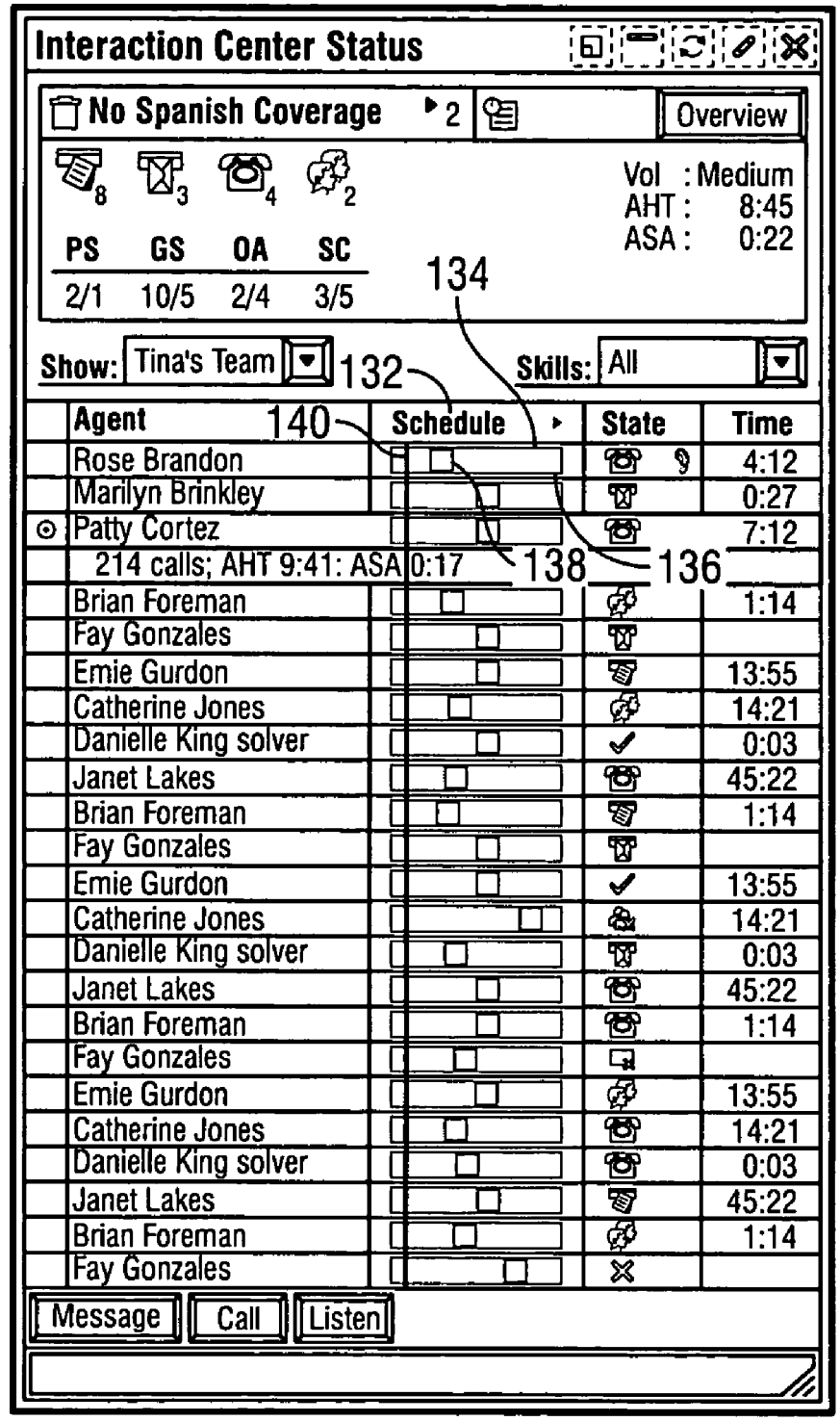

A switch indicator 112, shown as a triangle in FIG. 3A, may be provided to cause the dashboard to switch to a new display 130 with the agent's schedule 132 as illustrated in FIG. 4. A schedule bar 134 associated with each agent represents a period of time, such as an 8-hour period, and can indicate the times during that period when the agent is, or will be, available 134 and the time when the agent is not, or will not, be available 138. In the illustrated example, the darkened area on the schedule bar 134 represents the time that the interaction center agent is, or will be, unavailable. Queue 104 and schedule 132 may be displayed in the same column. An IC manager can alternate between the two columns views. The current time may be indicated 140. Displaying the agent schedule can help the IC manager in monitoring an agent. For example, the IC manager may not assign an agent to start an evaluation session that takes 45 minutes if the agent is scheduled to take a lunch break during that time interval. The schedule bar 134 may be for the entire day or some portion thereof. For example, the schedule bar may be a three-hour window starting 10 minutes before the current time.

Figure 5:
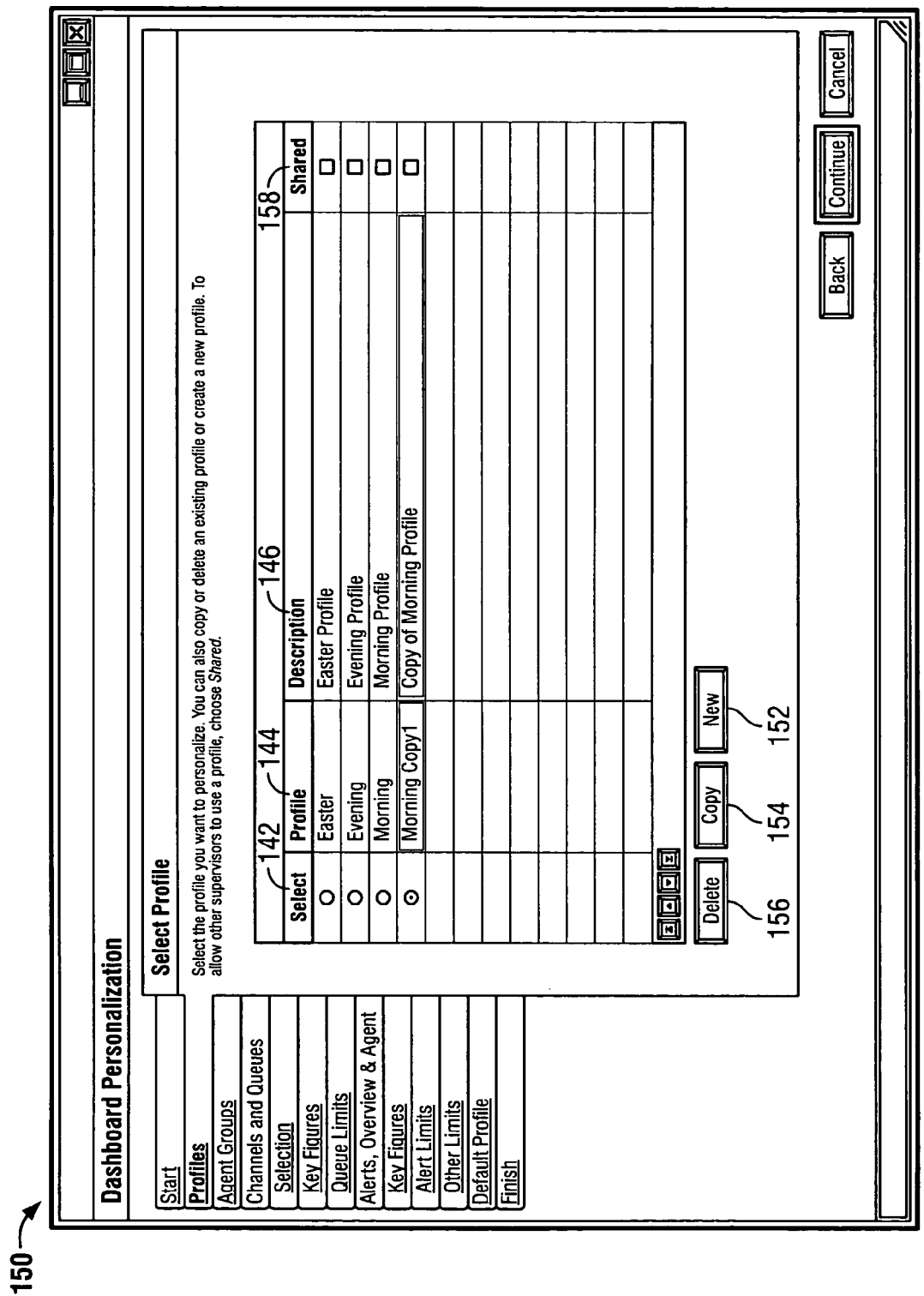

FIG. 5 illustrates an implementation of a screen 150 for managing dashboard personalization. IC managers can create profiles for various dashboard arrangements of interaction center activities. The profiles may personalize the dashboard for particular interaction center volumes. For example, an IC manager may have profiles 144 based upon expected call volume, such as holidays, evenings, and so on. A short description 146 may be provided to explain the profile. This option may allow the IC manager to save profiles that are commonly used, thus avoiding the need to recreate them. An IC manager can select a profile for personalization by clicking on the radio button 142. A new button 152 can be provided for creating a new profile. In an implementation, selecting the new button 152 adds an empty row. A value for the profile name and description can be entered. Personalization of the new profile is described below.

A copy button 154 may provide functionality to copy an existing profile for modification. In the example illustrated in FIG. 5, the existing profile "morning" is being copied. All the details of the existing profile will be copied to the new profile.

New values for the profile and description may be added. The copied profile may be modified as described below for a new profile. A particular profile may be selected 142 when needed and deleted 156 when there is no intention to reuse the profile.

In an implementation, an IC manager may share any or all of his profiles with others. A shared box 158 may be selected to permit others to use the IC manager's profiles. Others can then view this profile details and copy this profile to a new one, but will not be allowed to make any changes. Only the IC manager who owns the profile may make any changes to this profile. In an implementation, the IC manager may select a default profile for displaying the IC manager's dashboard.

Figure 6:
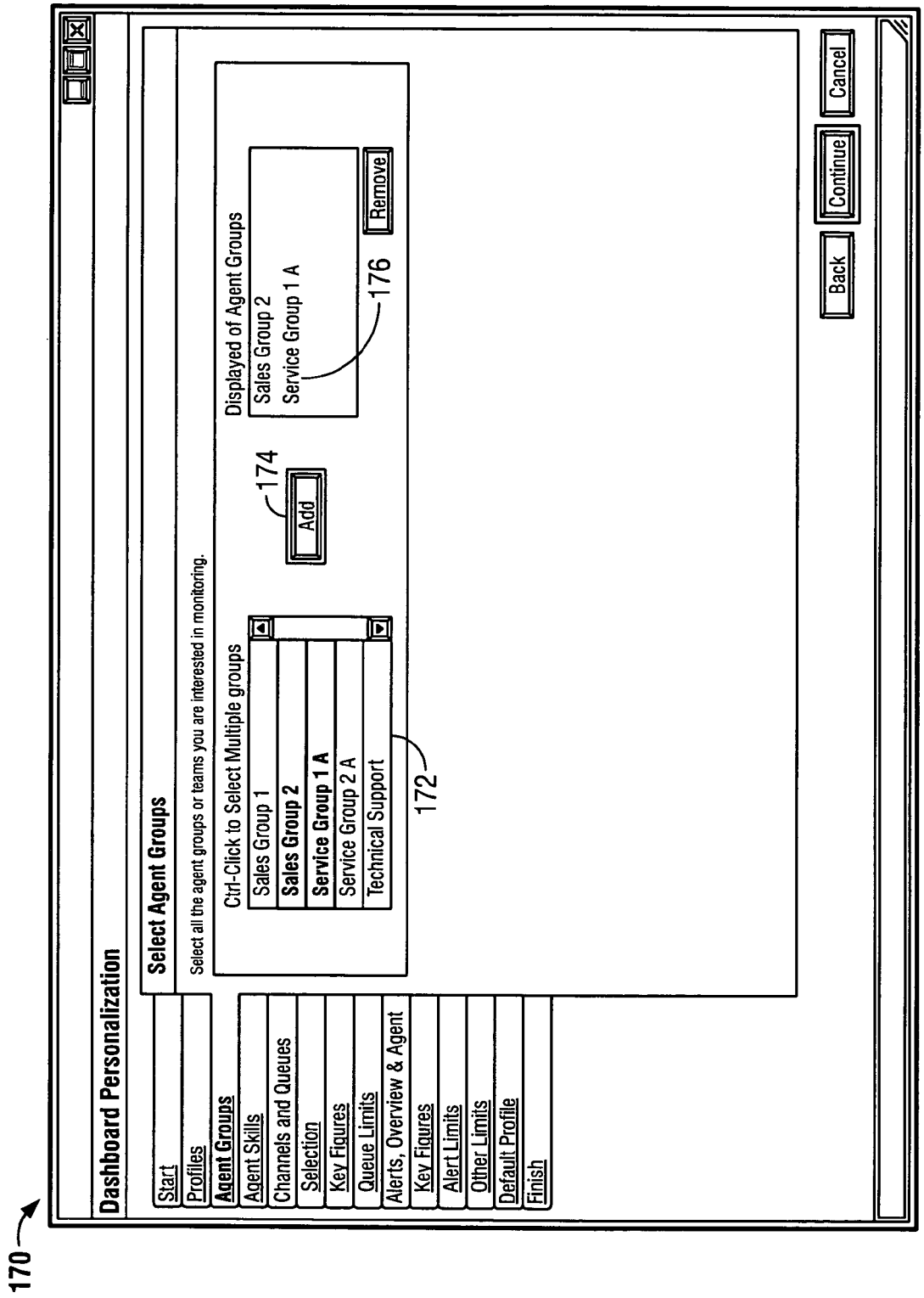

FIG. 6 illustrates an implementation of a screen 170 for personalizing a profile to display specified agent groups. Interaction center agents may be divided into agent groups. A listing of the available groups 172 may be displayed for selection by the IC manager. The selected groups may be added 174 to a listing of agent groups that will be displayed 176 on the dashboard. The groups selected include those that the IC manager wants to monitor on the personalized dashboard. The selected groups may be displayed in the drop-down box 804 of FIG. 3A as queues 104.

Figure 7:
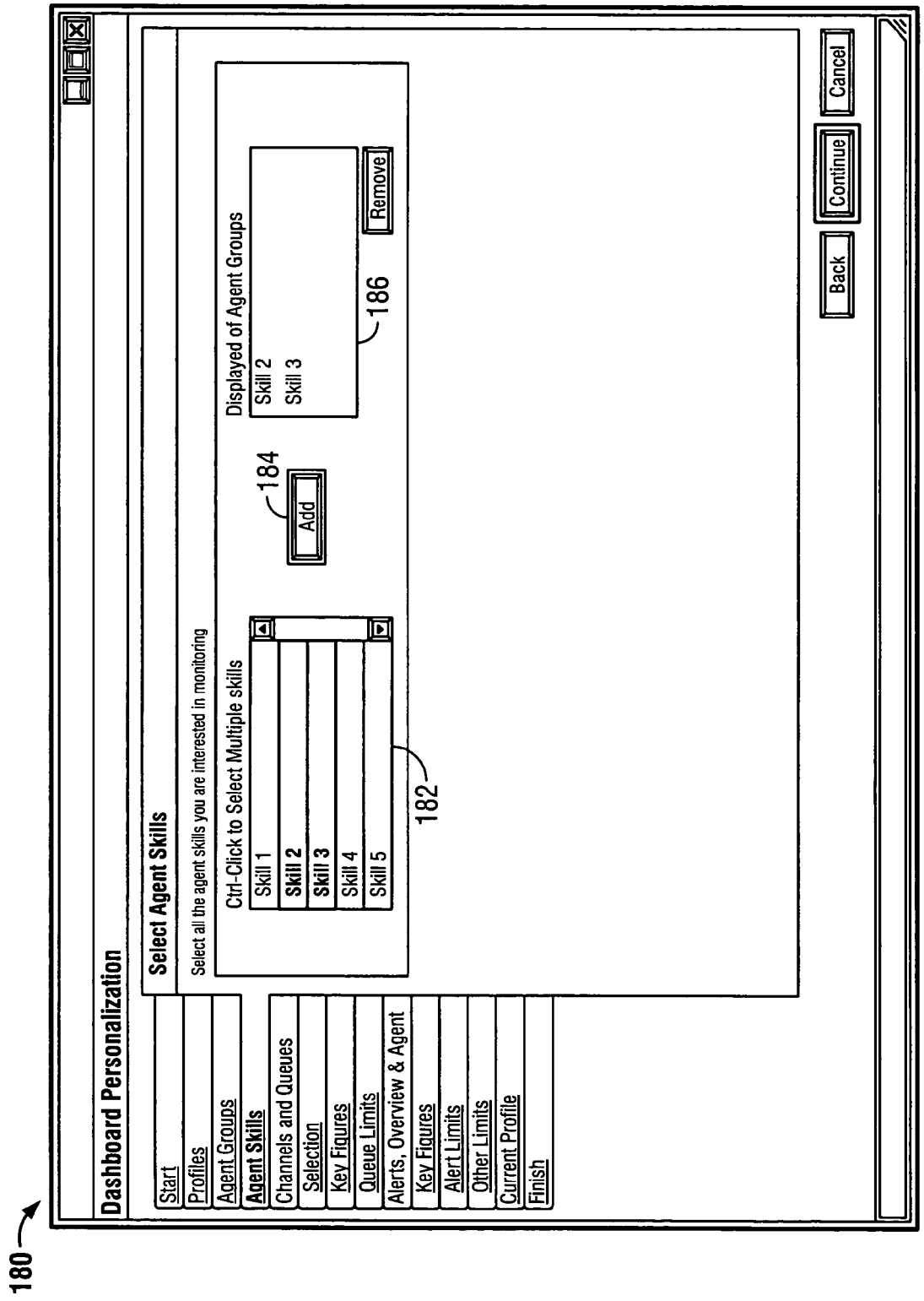

FIG. 7 illustrates an implementation of a screen 180 for selecting agents to be monitored based upon the agent's skills. An IC manager may select one or more skills from a listing of available agent skills 182 to add 184 to the list 186 of agent groups displayed on the dashboard. For example, an IC manager may desire to monitor the Spanish and Italian speaking agents in a sales group that deals in international sales.

FIG. 8 illustrates an implementation of a dashboard display 360 showing the skills 362 associated with each agent. The skills may be represented by code letters. The full view of the IC manager dashboard contains an agent list that has valuable information regarding the agents in the interaction center. As an example, an interaction center may have a Spanish Queue having agents capable of speaking Spanish for customers requiring a Spanish speaking agent. The IC manager selects a key figure to monitor the traffic in this queue. If the threshold is exceeded a message 364 may be displayed that reads, for example, "No Spanish Coverage." In this example, the IC manager may look at the skills 362 of each agent to see which agents are available with Spanish skills and consider assigning that agent to the Spanish-speaking queue.

In an alternate embodiment, the skills 362 listed in the column shown in FIG. 8 may not be directly displayed. Instead, the IC manager may utilize a drop-down menu to select one or more skills that are desired. In this fashion, the IC manager may filter the list of agents that are shown to those possessing the selected skills. For example, in the scenario described above, the IC manager may utilize the drop-down menu to select a skill for speaking "Spanish". Upon selection, the list of agents will be updated to display only those agents who are able to speak Spanish.

Figure 9:
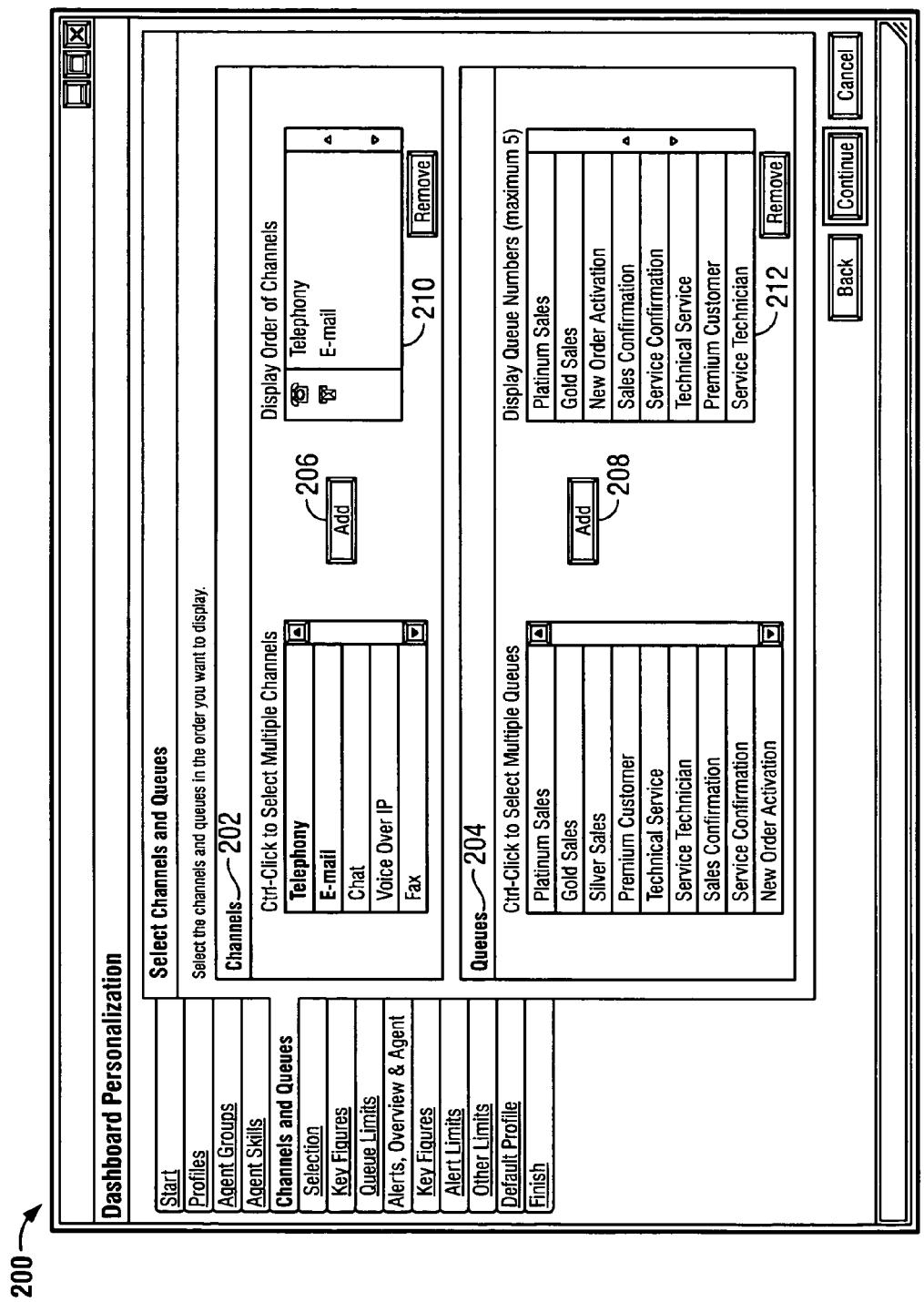

FIG. 9 illustrates an implementation of a screen 200 for personalizing an IC manager's dashboard for particular channels 202 and queues 204. The channels represent various forms of communication media that an interaction center agent may use and that the IC manager desires to monitor on the dashboard. Particular channels may be selected and added 206 to the dashboard display of channels 210. Queues 204 may also be selected and added 208 to the queues displayed 212 on the dashboard. Queues include various categories of interaction center calls or callers. For example, an IC manager may desire to monitor technical service calls and/or sales confirmations. The callers may be entitled to differing levels of service and the IC manager may desire to monitor how the callers in the differing levels are being serviced. In the example illustrated, callers have been categorized as platinum, gold, silver and premium sales customers.

Figure 10:
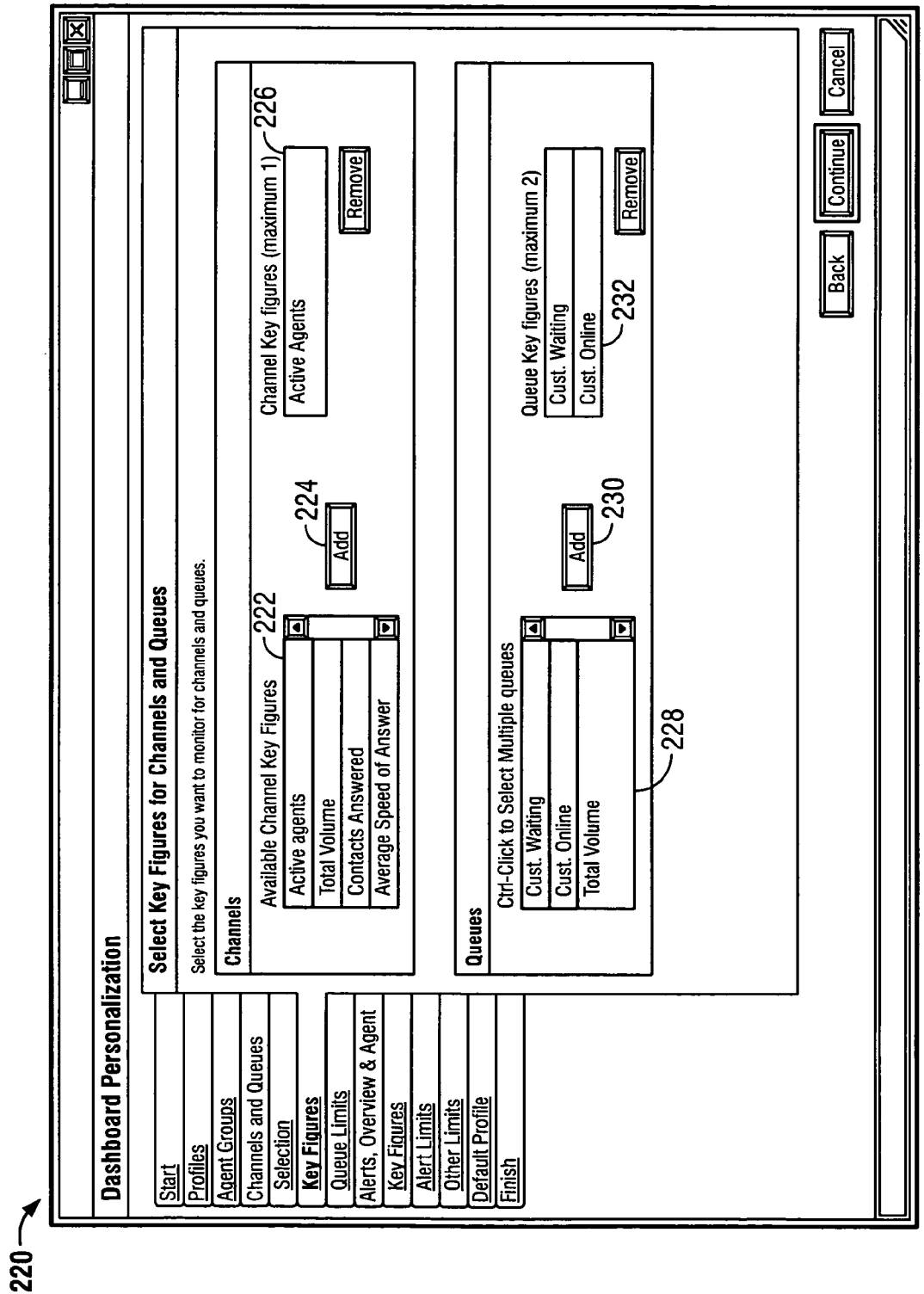

FIG. 10 illustrates an implementation of a display 220 for selecting key figures for the channels and queues on the dashboard. Key figures can be parameters associated with a channel or queue. An IC manager may desire to monitor the key figures of a channel or queue as, for example, a figure of merit for the channel or queue. The IC manager may select a channel key figure 222 and add 224 them to the channel key figure to be displayed 226 with the displayed channel. As an example, a key figure associated with a channel could be the number of active agents using the channel or the average speed of an answer on the channel. In the example illustrated, the IC manager has personalized the dashboard to display the number of active agents per channel. This key figure is shown as 160 in FIG. 3. For the queues selected, the IC manager may select a queue key figure 228 and add 230 the key figure to the key figures displayed 232 on the dashboard. As an example, the IC manager may desire to monitor the number of customers waiting in each queue. This may provide the IC manager with information on how best to balance the interaction center agents responding to calls in the queue.

Figure 11B:
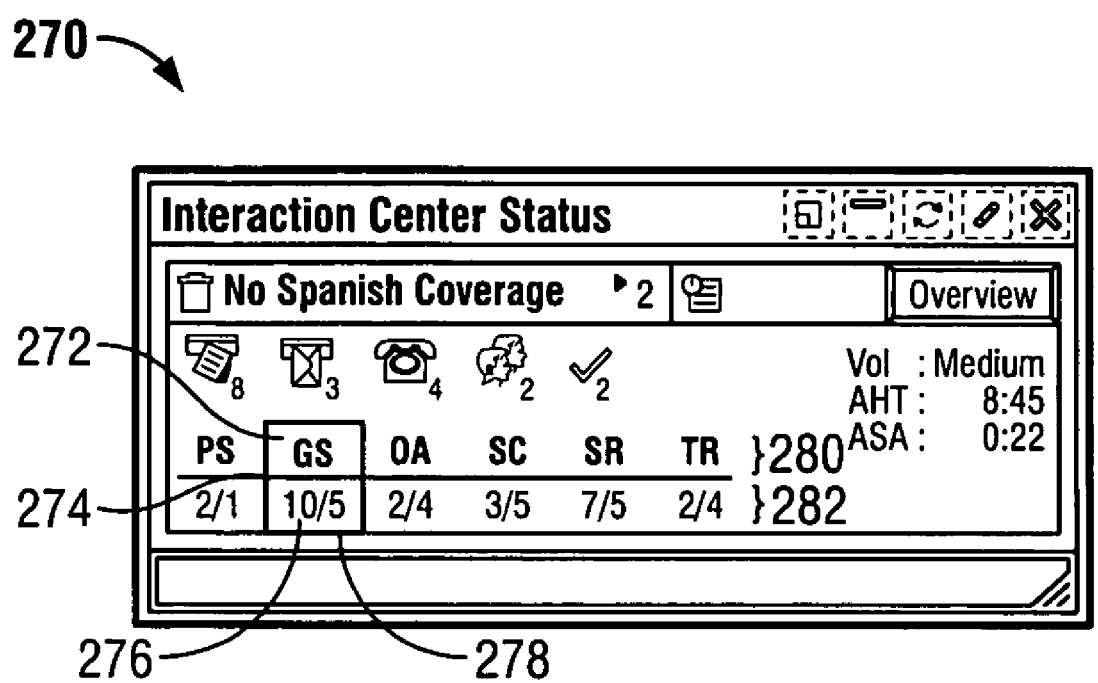

FIG. 11A is an implementation of a display 250 for setting threshold levels for the selected queues. The IC manager may configure desired thresholds for the queues and, when a threshold is crossed an indication may be given by the dashboard. In an implementation, the previously selected queues are displayed 252. The IC manager may select an abbreviation 254 for the queue that is displayed on the dashboard. Threshold limits 258 can be assigned by the IC manager for each of the previously selected key figures 256 associated with each queue. In the example illustrated, the IC manager has chosen a threshold limit of greater than 17 for the number of customers waiting 260 to be serviced in the Gold Sales (GS) queue. The IC manager also has chosen a threshold limit of less than 2 for the number of customers online 262 in the Platinum Sales queue. In the example illustrated, the IC manager has chosen to be alerted when the selected threshold relationships are exceeded. FIG. 11B illustrates an implementation of a partial dashboard display of queues 280 and values of key figures 282. In the illustrated example, the dashboard display has highlighted 274 the GS (Gold Sales) queue 272 because the key figure of customers waiting 276 is greater than the threshold value of 10 previously selected. F*igure* 278 shows the number of customers online being attended to and is not less than the threshold value of 2 previously selected. In another implementation, the dashboard system may be arranged to alert the IC manager only when all of the key figures cross the threshold limits specified in personalization. In yet another implementation, the IC manager may select which key figures or combination of key figures have to cross the threshold value to trigger an alert. The dashboard has alerted the IC manager to the queue by drawing a box around the display. Other alert mechanisms may be used including changing the color of the display and sounding an alarm.

Figure 12:
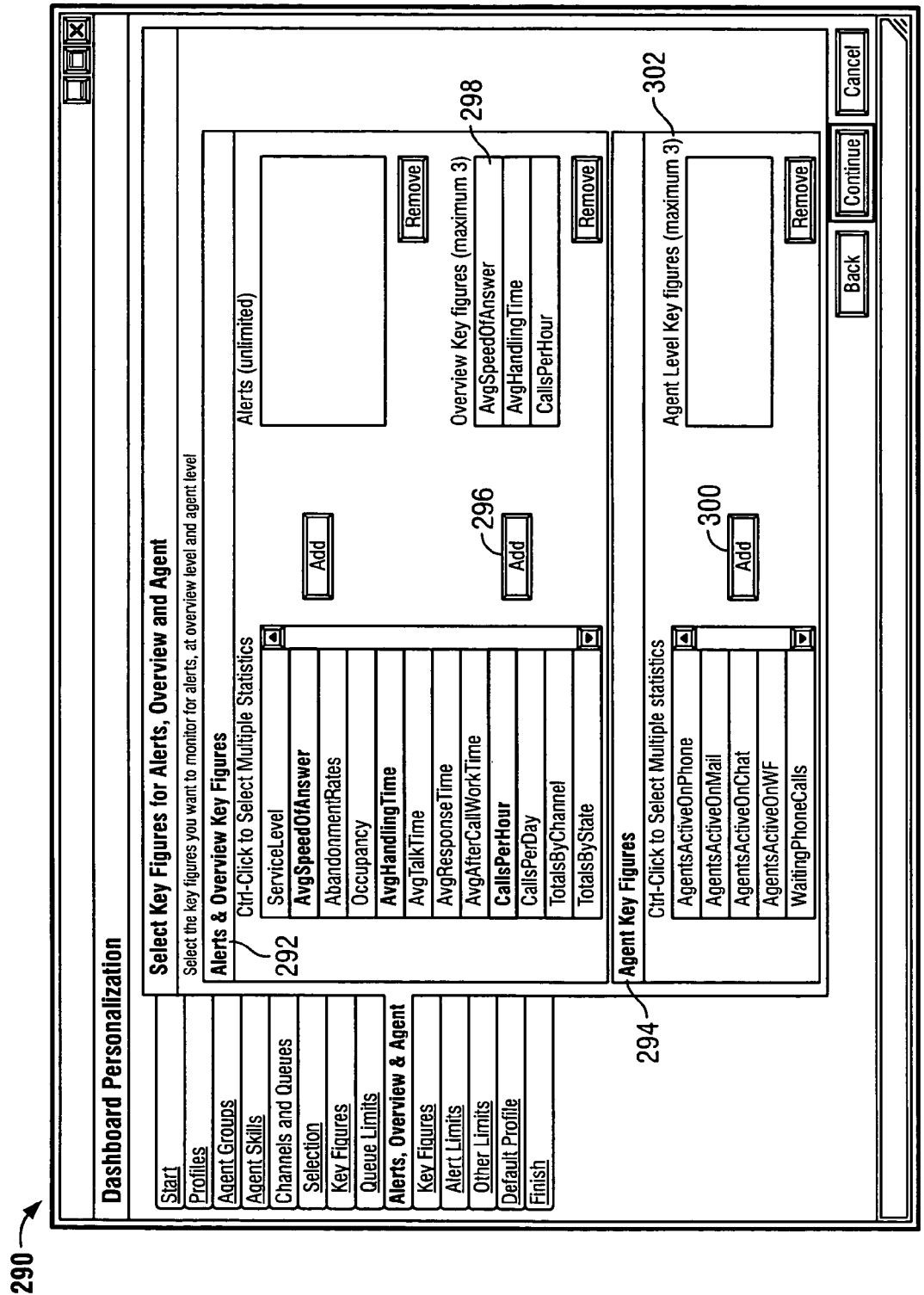

FIG. 12 is an implementation of a display 290 in which the IC manager can select key figures for interaction center overview statistics 292 and key figures for statistics associated with an agent 294. The interaction center overview statistics include service level, average speed to answer a call, rate of callers who abandon the call while waiting for service, average time to handle a call, average time that an agent is talking, calls received per hour, calls received per day, total calls per channel, total calls by state and other statistics that might be determined to be useful to an interaction center IC manager.

The overview key figures 292 may be added 296 to an overview key figures list 298. Agent key figures 294 are key figures associated with the agents and include agents on the phone, agents using the mail, agents using chat and agents available. The agent key figures may be added 300 to an agent key figures list 302.

Figure 13:
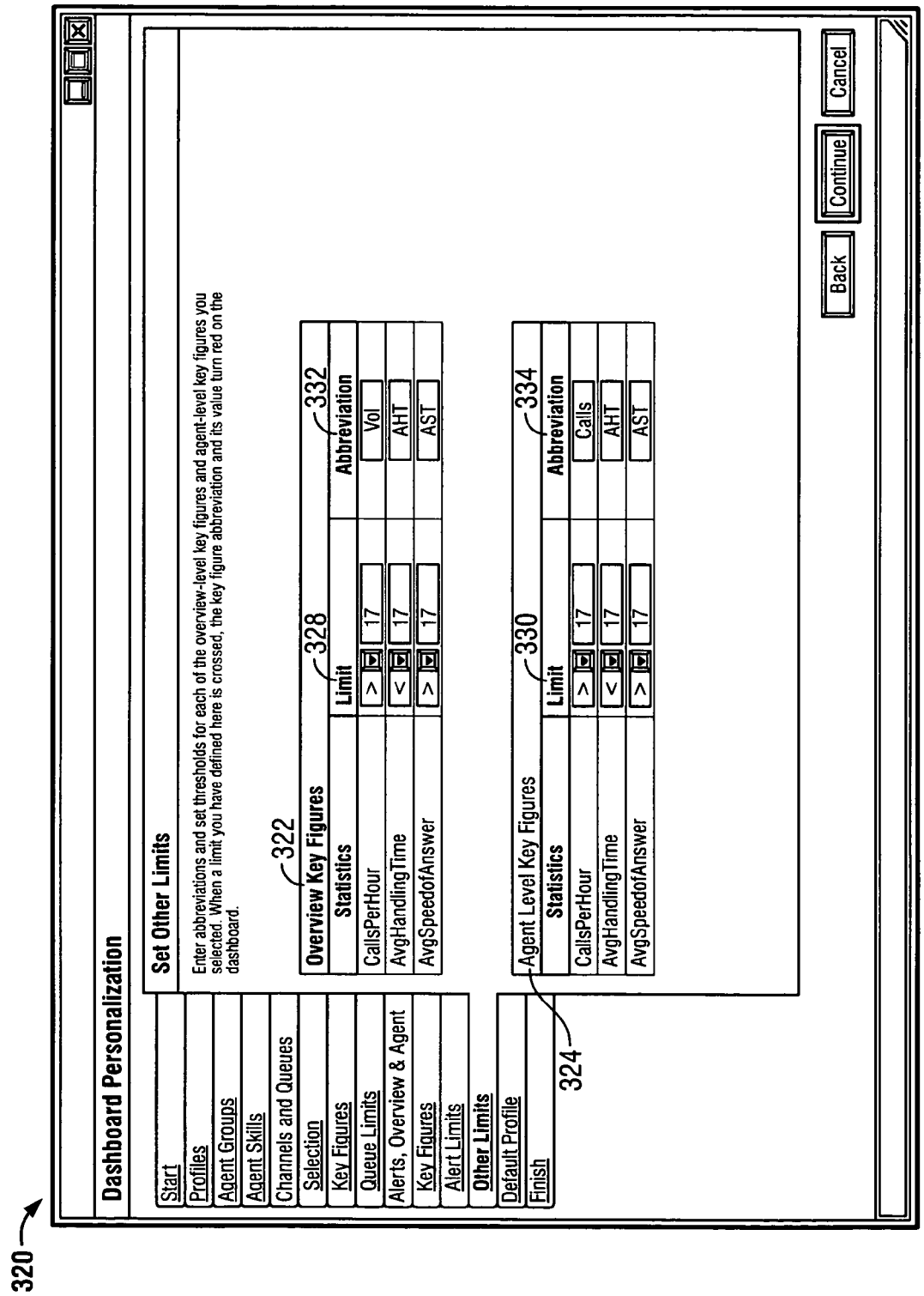

FIG. 13 illustrates an implementation of a display 320 for an IC manager to set threshold limits for the interaction center overview key figures 322 and agent key figures 324 previously selected. For each of the key figures a threshold limit and an abbreviation may be specified by the IC manager. Threshold limits 328, 330 and abbreviations 332, 334 may be set for each of the overview key figures and agent key figures, respectively.

FIG. 14 illustrates an implementation of a display 370 to enable an IC manager to set alert limits for the when selected statistics exceed specified limits. In the implementation illustrated, alert limits are specified each of three priority levels: high priority 372, medium priority 374 and low priority 376. The statistics 378, 380, 382 selected by the manager are listed for each alert level along with threshold limits 384, 386, 388. The corresponding alert message 390, 392, 396 may be displayed on the manager's dashboard when the corresponding threshold limit 384, 386, 388 is exceeded. The manager also may select an icon 394 for display on his dashboard when the alert level is at the low priority level 396. In the example shown, when a statistic "Calls per hour" 398a is less than 3, an alert limit 400a is at the low priority level. The manager's dashboard displays a telephone icon 402a and a message, "Calls/hr very low" 406a. When a "Calls per hour" 398b exceeds 10, an alert limit 400b is at a medium priority level. The manager's dashboard displays a message, "Calls/hr increase" 406b. When a "Calls per hour" 398c exceeds 17, an alert limit 400c is at a high priority level. The manager's dashboard displays a message, "Calls/hr very high" 406c. In an implementation, the high priority level also may be accompanied by a sound or other attention-getting mechanism to draw the manager's attention.

Figure 15:
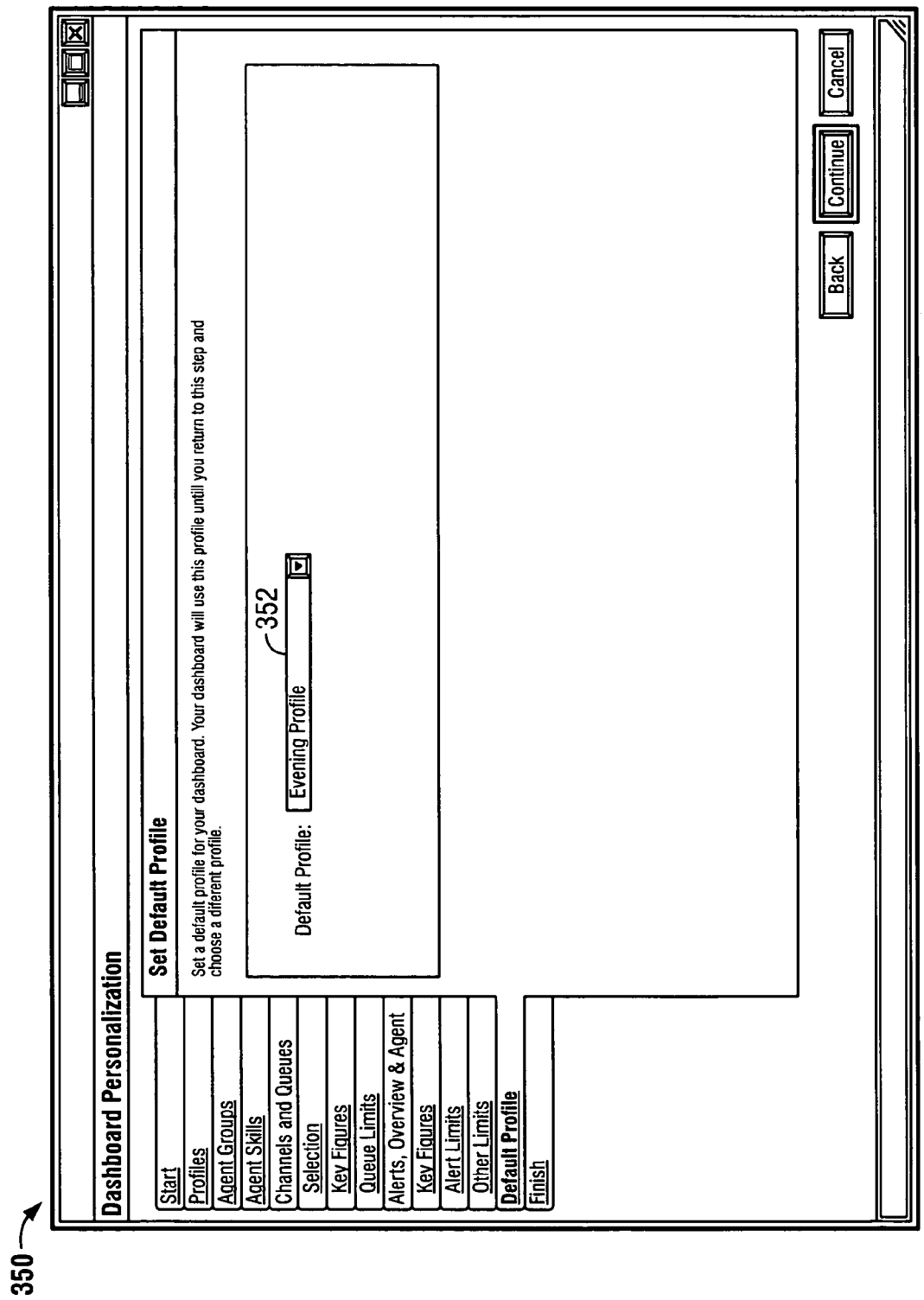

FIG. 15 illustrates an implementation of a display 350 wherein an IC manager may select one personalized profile for his or her default 352 dashboard profile. The default profile may be selected as one the profiles previously created by the IC manager as described above.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

Other embodiments are within the scope of the following claims.

What is claimed is:

1. A computer program product tangibly embodied on computer-readable storage medium and comprising computer readable and executable program instructions that when executed by a processor provide a visual display of an interaction center manager's graphical user interface on an interconnected display device, the manager's graphical user interface comprising:

an overview area displaying group statistics that relate to an overall responsiveness measure of a selected group of interaction center agents being monitored, and that indicate a number of customers present in each of multiple different customer queues to which at least one of the selected interaction center agents being monitored is assigned, wherein one of the multiple different customer queues is a particular queue for customers requiring an agent having a particular language skill, the overview area further displaying a visual alert configured to notify the manager when a number of customers waiting in the particular queue for an agent having the particular language skill exceeds a threshold number for the particular queue, the visual alert being configurable by a user to be displayed when the number of customers waiting in the particular queue for an agent having the particular language skill exceeds the threshold number for the particular queue; and a detailed area, separate from the overview area, the detailed area displaying a list of each agent of the selected group of interaction center agents being monitored and further displaying for each listed agent i) an indication that an agent has the particular language skill in connection with each of the listed agents that has the particular language skill, and ii) information specifying the availability of the listed agent during a future period of time.

2. The computer program product of claim 1, wherein the statistics are associated with user-created profiles that represent different sets of statistics displayed on the graphical user interface.

3. The computer program product of claim 1, wherein the display in the detailed area comprises one or more of the interaction center agent's name, queues, key figures for each queue, statistical measurements and alerts.

4. The computer program product of claim 1, wherein the at least one group statistic is selected from a group consisting of an average handling time, an average speed of answer, an abandonment rate, an average talk time, an average response time, calls per hour, calls per day, total calls by channel and total calls by state.

5. The computer program product of claim 1, wherein the detailed area includes, for each listed agent, at least one individual statistic that includes a current availability state or a communication state for each of the listed agents.

6. The computer program product of claim 5, wherein the communication state is selected from a group consisting of an active chat state, an active phone state, an active email state, and an active paging state.

7. A computer-implemented method of customizing an interaction center manager's graphical user interface, the method comprising:
receiving a selection of interaction center agents to be monitored using the manager's graphical user interface;
receiving a selection of overview statistics that characterize an overall responsiveness measure of the selected interaction center agents and that indicates a number of customers present in each of multiple different customer queues to which at least one of the selected interaction center agents is to be assigned, wherein one of the multiple different customer queues is a particular queue for customers requiring an agent having a particular language skill, and wherein the multiple different customer queues are being serviced by the selected group of interaction center agents so that the overview statistics as applied to the selected agents to be monitored are displayed in an overview area of the graphical user interface;
receiving a configuration of a visual alert to be provided on the overview area of the graphical user interface, the visual alert being configured to notify a manager when a number of customers waiting in the particular queue for an agent having the particular language skill exceeds a threshold number for the particular queue, the visual alert being configurable by a user to be displayed when the number of customers waiting in the particular queue for an agent having the particular language skill exceeds the threshold number for the particular queue; and
receiving a selection of detailed information that specifies the future availability of each of the selected interaction center agents and relates to the particular language skill associated with each of the selected interaction center agents, so that the selected information associated with each of the selected agents is displayed in a detailed area of the graphical user interface.

8. The method of claim 7, wherein the display in the detailed area comprises one or more of the interaction center agent's name, queues, key figures for each queue, statistical measurements and alerts.

9. The method of claim 8, further comprising receiving a selection of threshold values associated with each key figure.

10. The method of claim 9, further comprising providing an alert when a key figure exceeds the selected threshold value associated with the key figure.

11. The method of claim 10, wherein the alert comprises a visual indication on the display.

12. The method of claim 7, wherein the selected overview statistics are selected from a group consisting of an average handling time, an average speed of answer, an abandonment rate, an average talk time, an average response time, calls per hour, calls per day, total calls by channel and total calls by state.

13. The method of claim 7, wherein the selected detailed information associated with each of the selected agents includes a current availability state or a communication state.

14. The method of claim 13, wherein the communication state is selected from a group consisting of an active chat state, an active phone state, an active email state, and an active paging state.

15. A system for providing an interaction center manager's graphical user interface on an interconnected display device, the system comprising one or more computers configured to provide on the graphical user interface:
an overview area displaying group statistics that relate to an overall responsiveness measure of a selected group of interaction center agents being monitored, and that indicate a number of customers present in each of multiple different customer queues to which at least one of the selected interaction center agents being monitored is assigned, wherein one of the multiple different customer queues is a particular queue for customers requiring an agent having a particular language skill, the overview area further displaying a visual alert configured to notify the manager when a number of customers waiting in the particular queue for an agent having the particular language skill exceeds a threshold number for the particular queue, the visual alert being configurable by a user to be displayed when the number of customers waiting in the particular queue for an agent having the particular language skill exceeds the threshold number for the particular queue; and
a detailed area, separate from the overview area, the detailed area displaying a list of each agent of the selected group of interaction center agents being monitored and further displaying for each listed agent i) an indication that an agent has the particular language skill in connection with each of the listed agents that has the particular language skill, and ii) information specifying the availability of the listed agent during a future period of time.

16. A system for customizing an interaction center manager's graphical user interface, the system comprising one or more computers configured to:
receive a selection of interaction center agents to be monitored using the manager's graphical user interface;
receive a selection of overview statistics that characterize an overall responsiveness measure of the selected interaction center agents and that indicates a number of customers present in each of multiple different customer queues to which at least one of the selected interaction center agents is to be assigned, wherein one of the multiple different customer queues is a particular queue for customers requiring an agent having a particular language skill, and wherein the multiple different customer queues are being serviced by the selected group of interaction center agents so that the overview statistics as applied to the selected agents to be monitored are displayed in an overview area of the graphical user interface;
receive a configuration of a visual alert to be provided on the overview area of the graphical user interface, the visual alert being configured to notify a manager when a number of customers waiting in the particular queue for an agent having the particular language skill exceeds a threshold number for the particular queue, the visual alert being configurable by a user to be displayed when the number of customers waiting in the particular queue for an agent having the particular language skill exceeds the threshold number for the particular queue; and receive a selection of detailed information that specifies the future availability of each of the selected interaction center agents and relates to the particular language skill associated with each of the selected interaction center agents, so that the selected information associated with each of the selected agents is displayed in a detailed area of the graphical user interface.

* * * * *